United States Patent
Sonn et al.

(10) Patent No.: US 12,307,624 B2
(45) Date of Patent: May 20, 2025

(54) SYSTEM AND METHOD FOR REGISTRATION OF HELIOSTAT IMAGES USING REFLECTIVE DOME FIDUCIALS

(71) Applicant: Heliogen Holdings, Inc., Pasadena, CA (US)

(72) Inventors: Alexander Anthony Sonn, San Gabriel, CA (US); Tori Gupta Cook, Altadena, CA (US)

(73) Assignee: Heliogen Holdings, Inc., Pasadena, CA (US)

( * ) Notice: Subject to any disclaimer, the term of this patent is extended or adjusted under 35 U.S.C. 154(b) by 449 days.

(21) Appl. No.: 17/932,108

(22) Filed: Sep. 14, 2022

(65) Prior Publication Data

US 2024/0054599 A1 Feb. 15, 2024

Related U.S. Application Data

(60) Provisional application No. 63/371,366, filed on Aug. 12, 2022.

(51) Int. Cl.
| | |
|---|---|
| *G06V 10/60* | (2022.01) |
| *G06T 3/147* | (2024.01) |
| *G06T 5/40* | (2006.01) |
| *G06T 7/60* | (2017.01) |
| *G06T 7/70* | (2017.01) |

(Continued)

(52) U.S. Cl.
CPC ................ *G06T 3/147* (2024.01); *G06T 5/40* (2013.01); *G06T 7/60* (2013.01); *G06T 7/70* (2017.01);

(Continued)

(58) Field of Classification Search
CPC .. G06T 3/147; G06T 5/40; G06T 7/60; G06T 7/70; G06T 2207/20024;

(Continued)

(56) References Cited

U.S. PATENT DOCUMENTS

| | | |
|---|---|---|
| 7,690,377 B2 | 6/2010 | Goldman et al. |
| 8,063,349 B2 | 11/2011 | Huss et al. |

(Continued)

FOREIGN PATENT DOCUMENTS

WO   WO 2022-012952 A1   1/2022

OTHER PUBLICATIONS

Rumpler, M: Automated End-to-End Workflow for Precise and Geo-accurate Reconstructions using Fiducial Markers, ISPRS Ann. Photogramm. Remote Sens. Spatial Inf. Sci., II-3, 135-142, https://doi.org/10.5194/isprsannals-II-3-135-2014 (Year: 2014).*

(Continued)

*Primary Examiner* — Siamak Harandi
*Assistant Examiner* — Helen Deng Shi
(74) *Attorney, Agent, or Firm* — Knobbe, Martens, Olson & Bear LLP (57) ABSTRACT

A system and method for registering images captured by a camera of heliostats in a heliostat field for use in tracking control of the heliostats is disclosed. The method includes calculating a geographical location of a reflection of the sun on a reflective dome surface of fiducial markers positioned relative to the heliostat field that are in a field of view of the camera, the geographical location calculated based on a location of the sun at a time corresponding to a time-stamp of the captured image, a geographical location and a radius of the reflective dome of the fiducial markers, and a geographical location of the viewing camera. A correct mapping of the fiducial markers in the captured image is identified. Optionally, an affine transform is applied to the captured image via rotation and translation so that pixels in the transformed image for the fiducial markers map to geographical coordinates of the fiducial markers.

27 Claims, 9 Drawing Sheets

(51) Int. Cl.
*G06V 10/25* (2022.01)
*G06V 10/74* (2022.01)

(52) U.S. Cl.
CPC .............. *G06V 10/25* (2022.01); *G06V 10/60* (2022.01); *G06V 10/761* (2022.01); *G06T 2207/20024* (2013.01); *G06T 2207/30204* (2013.01)

(58) Field of Classification Search
CPC ... G06T 2207/30204; G06T 7/33; G06T 7/73; G06T 3/00; G06V 10/25; G06V 10/60; G06V 10/761; F24S 50/20; F24S 2050/25
See application file for complete search history.

(56) References Cited

U.S. PATENT DOCUMENTS

| | | |
|---|---|---|
| 8,490,618 B2 | 7/2013 | Kroizer et al. |
| 8,739,775 B2 | 6/2014 | Kroyzer et al. |
| 9,347,685 B2 | 5/2016 | Plotkin et al. |
| 11,035,592 B1 | 6/2021 | Gross et al. |
| 11,323,063 B2 | 5/2022 | Gross et al. |
| 2007/0221208 A1 | 9/2007 | Goldman |
| 2010/0236239 A1 | 9/2010 | Kroizer et al. |
| 2010/0300510 A1 | 12/2010 | Goldman et al. |
| 2013/0021471 A1 | 1/2013 | Waterhouse et al. |
| 2021/0381970 A1 | 12/2021 | Bern et al. |
| 2022/0079790 A1 | 3/2022 | Sonn |
| 2023/0091829 A1* | 3/2023 | Brost ................ H02S 40/22 382/154 |
| 2023/0381970 A1 | 11/2023 | Khansari Zadeh et al. |

OTHER PUBLICATIONS

PCT International Search Report and Written Opinion, mailed May 4, 2023, regarding International Application No. PCT/US2022/076409, 9 pages.

* cited by examiner

SYSTEM AND METHOD FOR REGISTRATION OF HELIOSTAT IMAGES USING REFLECTIVE DOME FIDUCIALS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is directed to tracking control of heliostats, and more particularly to a system and method for registration of images of heliostats using reflective dome fiducials.

Description of the Related Art

Heliostats are controlled to track the sun and focus the solar energy on a receiver. Tracking control may include the use of cameras that take images of the heliostats. However, cameras are difficult to mount in a perfectly rigid way, allowing for movement of the cameras due to, for example, wind and thermal expansion of the camera mounts, which can introduce errors in estimating the positions of the heliostats in images captured by the cameras. This can lead to errors in the estimated orientation of the heliostats calculated from images captured by the cameras, which can lead to errors in orienting the heliostats relative to the sun and less sunlight concentrated on the receiver by the heliostats, reducing the efficiency of the system.

SUMMARY

In accordance with one aspect of the disclosure, a system for registration of heliostat images for use in tracking control of heliostats in a heliostat field of a concentrated solar power (CSP) plant is provided. The system comprises one or more cameras arranged relative to the heliostat field so that the heliostats are in a field of view of the one or more cameras, the one or more cameras operable to capture an image of the heliostat field. The system also comprises a plurality of fiducial markers positioned relative to the heliostats of the heliostat field so that the fiducial markers are in the field of view of the one or more cameras, each of the fiducial markers having a reflective dome configured to reflect a sun. The system also comprises a processor configured to: a) receive the captured image, b) calculate a geographical location of a reflection of the sun on a surface of the reflective dome of the fiducial markers based on a location of the sun at a time corresponding to a time-stamp of the captured image, a geographical location and a radius of the reflective dome of the fiducial markers, and a geographical location of the one or more cameras that view the reflection, and c) identify a correct mapping of the fiducial markers in the captured image.

In accordance with another aspect of the disclosure, a method for registration of heliostat images for use in tracking control of heliostats in a heliostat field of a concentrated solar power (CSP) plant is provided. The method includes the step of receiving with a computer processor an image of the heliostat field captured by one or more cameras. The method also includes the step of calculating a geographical location of a reflection of a sun on a surface of a reflective dome of a plurality of fiducial markers positioned relative to the heliostat field so as to be in a field of view of the one or more cameras. The geographical location is calculated based on a location of the sun at a time corresponding to a time-stamp of the captured image, a geographical location and a radius of the reflective dome of the fiducial markers, and a geographical location of the one or more cameras that view the reflection. The method also includes the step of identifying a correct mapping of the fiducial markers in the captured image.

In accordance with another aspect of the disclosure a computer executable code stored in a computer readable memory is provided. When executed by a computer processor, the computer executable code is configured to cause the computer processor to receive an image of a heliostat field captured by one or more cameras. The computer executable code is also configured to calculate a geographical location of a reflection of a sun on a surface of a hemispherical reflective dome surface of a plurality of spaced apart fiducial markers that are positioned relative to the heliostat field so as to be in a field of view of the one or more cameras. The geographical location is calculated based on a location of the sun at a time corresponding to a time-stamp of the captured image, a geographical location and a radius of the reflective dome of the fiducial markers, and a geographical location of the one or more cameras that view the reflection. The computer executable code is also configured to identify a correct mapping of the fiducial markers in the captured.

BRIEF DESCRIPTION OF THE DRAWINGS

The present invention is illustrated by way of example and not limitation in the figures of the accompanying drawings, and in which.

DETAILED DESCRIPTION

Figure 1:
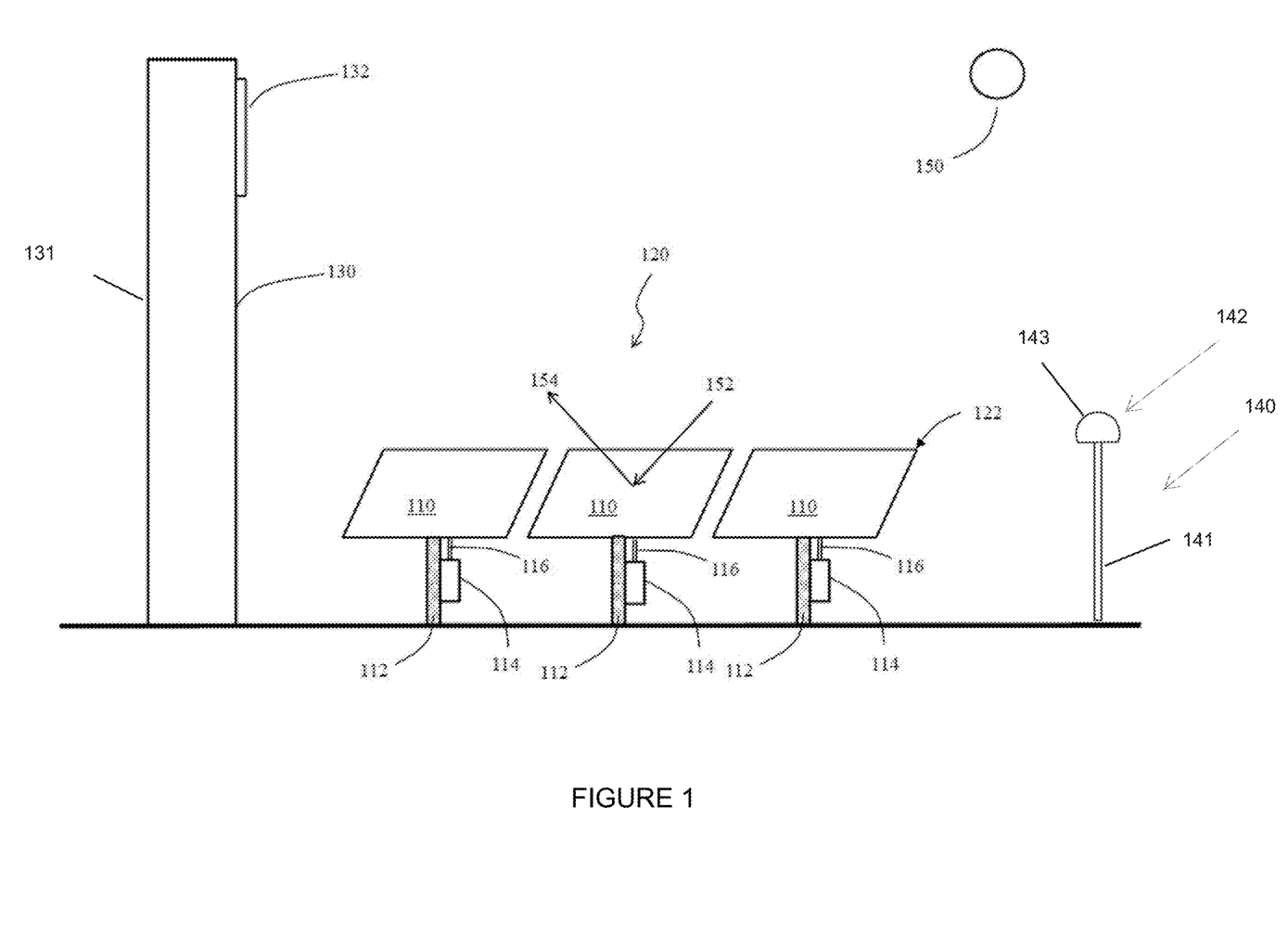
FIG. 1 is a schematic elevation view of a concentrated solar power (CSP) system with an array of heliostats and a receiver.

FIG. 1 shows an elevation view of a heliostat array or field 120 and a receiver 130 of a concentrated solar power (CSP)

system or plant. The receiver 130 can include a tower 131 and an aperture 132. The heliostat array or field 120 includes one or more (e.g., multiple) heliostats 122 that are distributed in two dimensions in proximity to the receiver 130. Each heliostat 122 includes a mirror 110 pivotably coupled to a frame or stanchion 112 affixed to (e.g., disposed on, embedded in) the ground and/or to other heliostats. Each heliostat 122 further includes a tracking controller 114 operable to determine the proper orientation of its associated mirror 110 throughout the day. A mirror 110 is properly oriented when the incoming light 152 from the sun 150 is reflected to (e.g., concentrated on) the solar thermal receiver 130, specifically the receiver aperture 132. In another implementation, all of the heliostats 122 in the heliostat array or field 120 share the same tracking controller that determines the proper orientation of the mirrors 110 of the heliostats 122 throughout the day. If the actual orientation of the mirror 110 differs from the proper orientation at that instant, the tracking controller 114 energizes actuator(s) 116 that drive the mirror 110 to the proper orientation (e.g., elevation angle and azimuth angle of the mirror 110). Determining the proper orientation of the mirror 110 for each heliostat 122 includes estimating the normal angle of the heliostat 122 (e.g., of the mirror 110)— that is the perpendicular angle to the mirror 110 of the heliostat 122.

Figure 2:
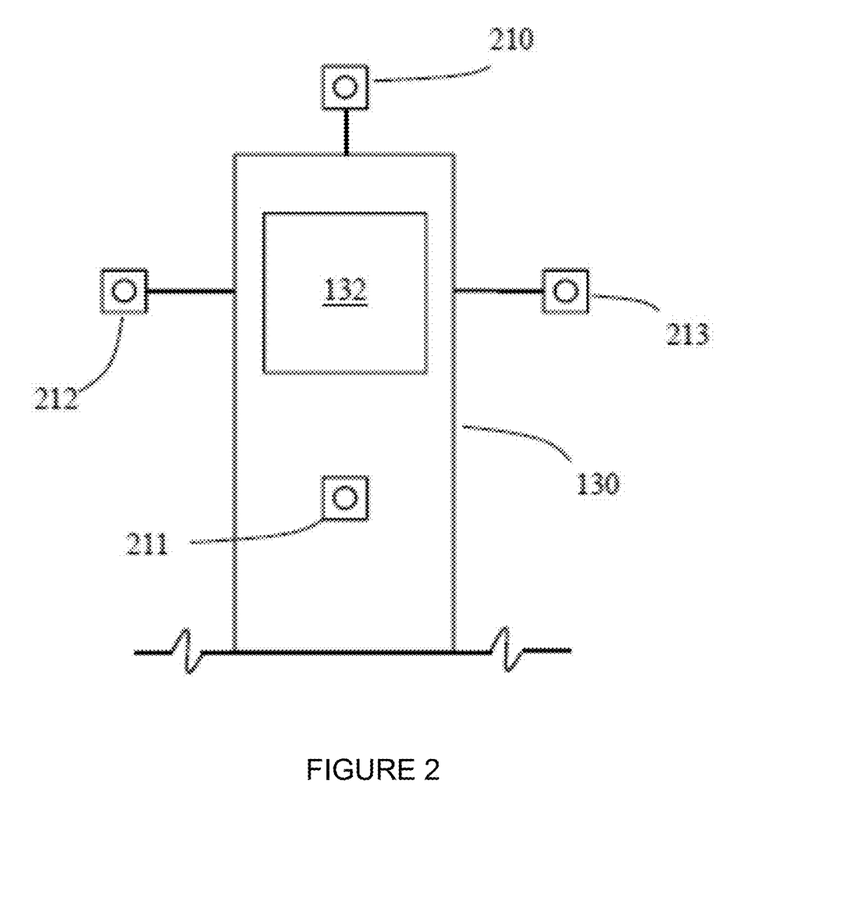
FIG. 2 is a front side view of the receiver.

FIG. 2 shows an elevation view of the front side of the solar thermal receiver 130 and aperture 132 for receiving sunlight into the receiver 130. The receiver 130 may further include absorbers that convert the sunlight to heat and transfer the heat to air, water, molten salt, sand or another working fluid or material. In the illustrated implementation, one or more cameras (e.g., multiple cameras) 210, 211, 212, 213 can be mounted to the receiver 130 (e.g., to the tower 131). In the illustrated example, four cameras 210-213 are shown. However, the system can include more or fewer cameras. Additionally or alternatively, one or more of the cameras can be mounted to other towers, not the receiver tower 131. The cameras 210, 211, 212, 213 are arranged so that the heliostats 122 of the heliostat array or field 120 are in the field of view of the cameras 210, 211, 212, 213 (e.g., in the field of view of each and every one of the cameras), and so the cameras 210, 211, 212, 213 can capture images of the heliostat mirrors 110 and the reflections therein. In one implementation, the left camera 212 and the right camera 213 are the same distance from the aperture 132. In one implementation, the upper camera 210 and lower camera 211 are the same distance from the aperture 132.

The cameras 210, 211, 212, 213 are installed at known locations (e.g., known geographical locations) and their aim is calibrated by detecting features in the images and solving parameters of an optical model. The cameras 210-213 captured images of the heliostats 122 in the heliostat field 120. The pixels comprising each heliostat 122 in the image, called the heliostat's region of interest (ROI), are used to estimate the normal angle for each heliostat 122. The ROI for each heliostat 122 is calculated using their known geographical (e.g., real-world) location (e.g., due to surveying performed during installation of the heliostats 122) and the location, aim, and intrinsic parameters of the cameras 210-213. Additional corrections to this calculated location for the ROI may be computed based on two dimensional interpolation.

The cameras 210, 211, 212, 213 (e.g., digital cameras with image or optical sensors) may be any of a number of different types of two-dimensional imagers, including still cameras and video cameras. Image data observed in the multiple mirrors 110 (e.g., by the optical or image sensors of the camera(s)) is combined to determine (e.g., using a computer processor) the elevation and azimuth angles of each heliostat mirror 110.

Figure 3:
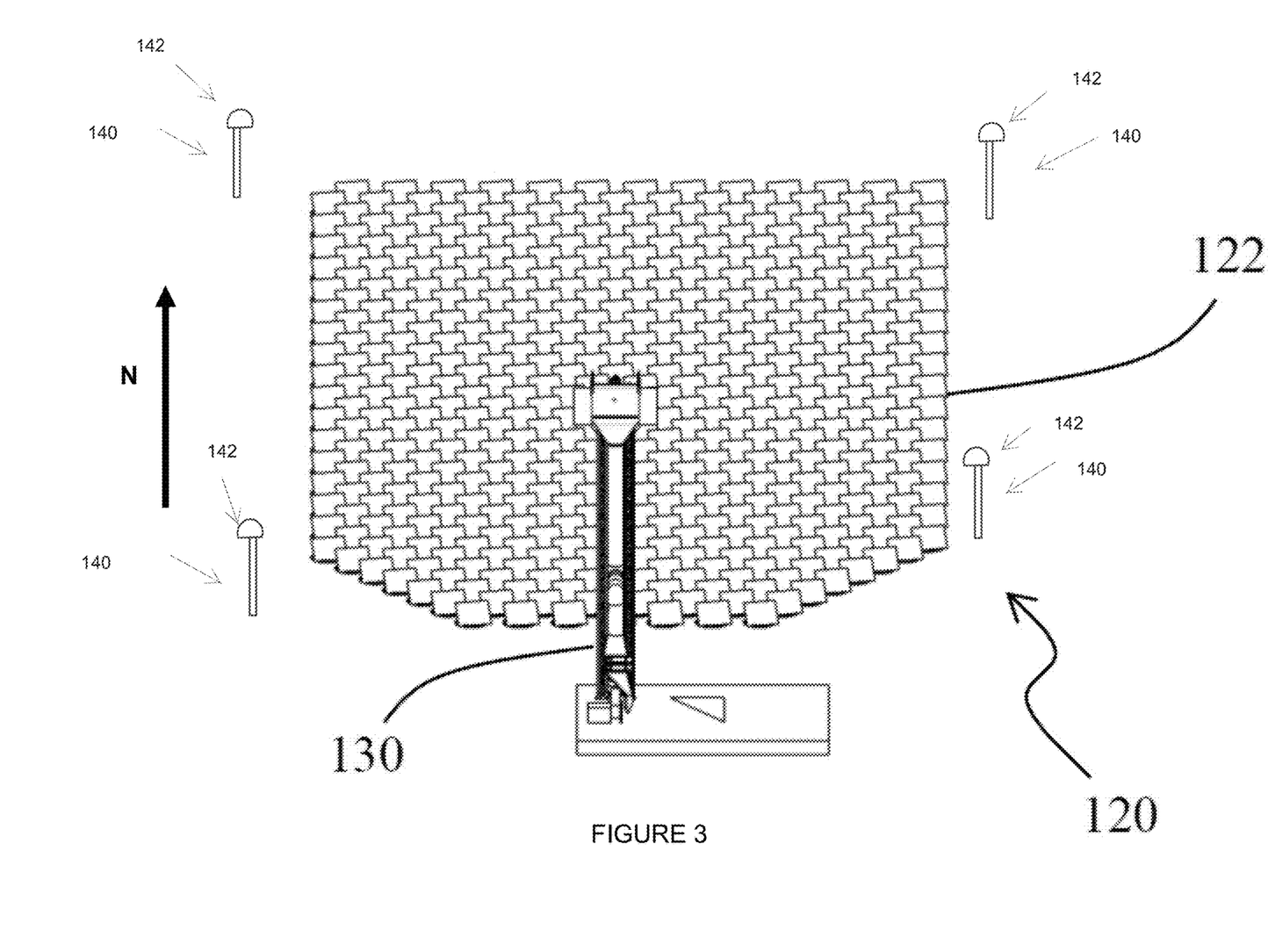
FIG. 3 is a schematic perspective view of the array of heliostats and receiver of the concentrated solar power (CSP) system.

FIG. 3 shows a perspective view of the heliostat array or field 120 and receiver 130. In the illustrated example, the array of heliostats 120 is located in the northern hemisphere, and the heliostats 122 are north of the receiver 130. The cameras 210, 211, 212, 213, although not visible in this figure, have a field of view sufficient to capture a complete image of all of the mirrors 110 of the heliostats 122 in the heliostat array or field 120 (e.g., each camera has a field of view that captured all of the mirrors 110 of the heliostats 122 in the heliostat array or field 120).

As shown in FIGS. 1 and 3, one or more (e.g., 2, 3, 4, 5) fiducial markers 140 are affixed (e.g., disposed on, embedded in) the ground and distributed in proximity to heliostats 122 of the heliostat array or field 120. In one example, the one or more fiducial markers 140 can be two spaced-apart fiducial markers 140. In another example, the one or more fiducial markers 140 can be three spaced-apart fiducial markers 140. In one example, shown in FIG. 3, the fiducial markers 140 can be distributed around the heliostat array or field 120. Additionally or alternatively, the fiducial markers 140 can be distributed within the heliostat array or field 120 (e.g., between heliostats 122 of the array 120). Each of the fiducial markers 140 has a reflective dome 142 (e.g., dome shaped mirror) that can reflect the sun 150. The reflective dome 142 is supported on a shaft 141. The fiducial markers 140 can be installed at pre-surveyed locations (e.g., at known geographical locations), so that distances between the fiducial markers 140 (e.g., between the reflective domes 142 of the fiducial markers 140) are known. The cameras 210, 211, 212, 213, although not visible in FIGS. 1, 3, have a field of view sufficient to capture all of the fiducial markers 140 (e.g., to capture the reflective dome 142 of the fiducial markers 140). The camera model used with the cameras 210-213 defines a world-to-pixel transform that locates the pixel coordinate of a feature given its real-world coordinate. The pixel locations of the reflective dome 142 of the fiducial markers 140 are detected in the same images taken by the cameras 210-213 of the heliostat field 120 and the offsets between the model-predicted and detected pixel locations are recorded as discussed below.

The reflective dome 142 can have a hemispherical shape with a spherical outer surface 143 (e.g., an outer surface defined by radius from a spherical mirror center). In some implementations, the reflective dome 142 (e.g., spherical outer surface 143) can have a diameter between 15 inches and 30 inches. The reflective dome 142 can reflect the sun 150 as a bright spot or reflection point at a point that can be computed as the solution to Alhazen's problem (e.g., at a point on the spherical outer surface 14 where the camera sees the reflection of the sun, which is the point having a normal that bisects the vectors from the point to the camera and to the sun).

Advantageously, the reflective dome 142 can reflect the sun as a bright spot that is visible in images captured by the cameras 210-213 even at low exposure levels (e.g., low exposure levels used so that the ROI pixels in the image are not saturated by the heliostats 122 reflecting parts of the sky that are close to the sun and are therefore much brighter than the fiducial markers. Advantageously, the reflective dome 142 (e.g., domed shaped mirror) of the fiducial markers 140 ensures that the reflection of the sun 150 is visible throughout the day. After an image is captured by the cameras 210-213, the reflection of the sun 150 is detected in the image and its real-world position is calculated from the known install location of the reflective dome 142 (e.g., of the fiducial markers 140) plus an offset to account for the location of the reflection based on the location of the sun 150 and the optical properties of the reflective dome 142, as further discussed below.

To correct for errors that may be introduced in the world-to-pixel transform of the reflective domes 142 of the fiducial markers 140 due to a wind load on the cameras 210-213, thermal expansion and/or movement of the camera mounts, each image captured by the cameras 210-213 is registered, which is a process by which the actual aim of the cameras 210-213 is determined and a translation and rotation is applied to each pixel in the image to transform it into a nominal coordinate system, using the algorithm described below.

Description of Algorithm

Figure 4:
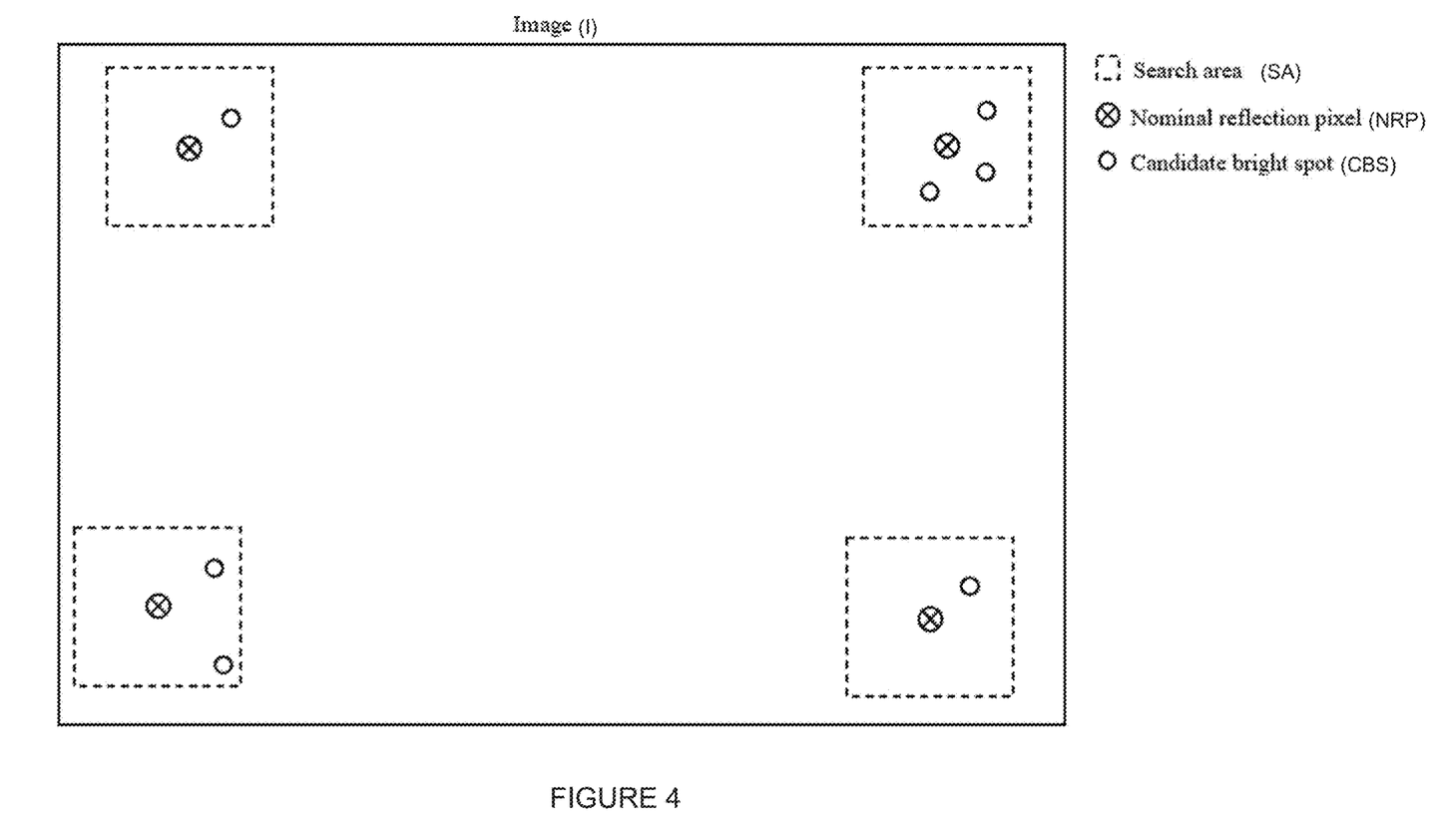
FIG. 4 illustrates an image captured by a camera of the CSP system where squares around the nominal pixel location of the reflections are used as the search areas to find candidate bright spots corresponding to fiducial markers.
Figure 5:
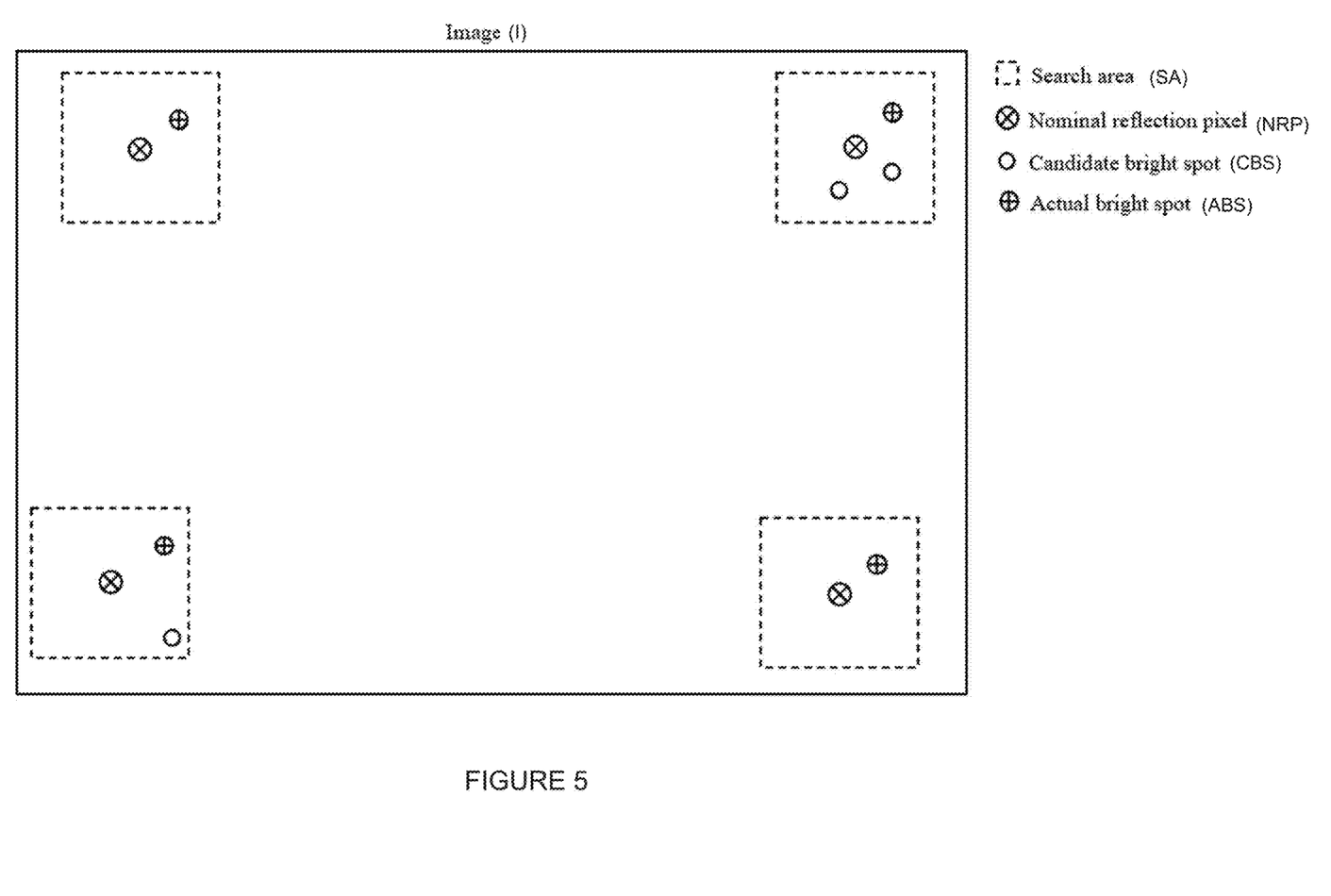
FIG. 5 shows the image in FIG. 4 with multiple candidate bright spots for a single fiducial marker, where the bright spot mapping corresponding to the fiducial markers is determined by finding the one that best preserves distances between the fiducial markers.
Figure 6:
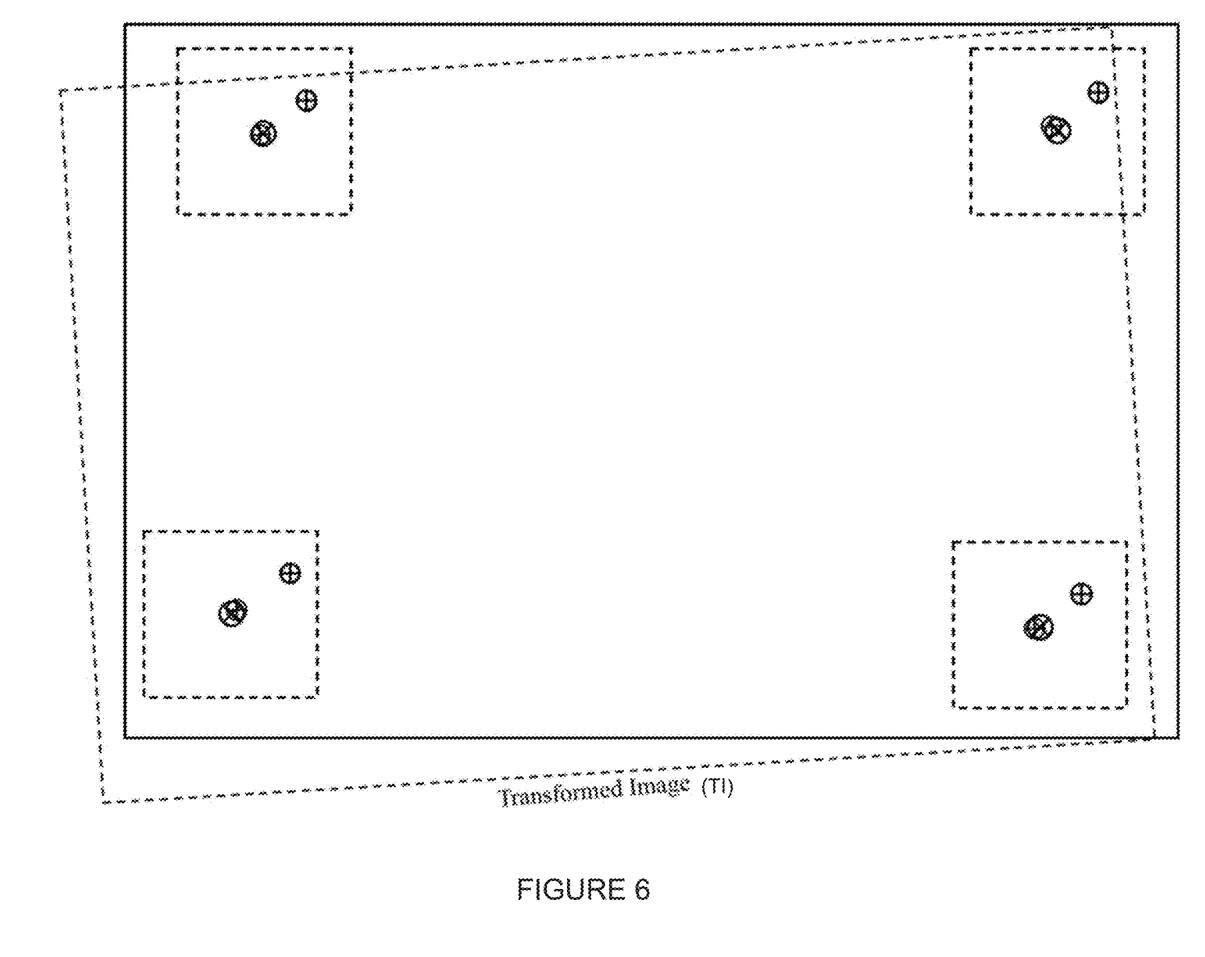
FIG. 6 illustrates a registered image with all the pixels in the image transformed such that the detected bright spots corresponding to the fiducial markers appear at the nominal fiducial pixels.
Figure 7:
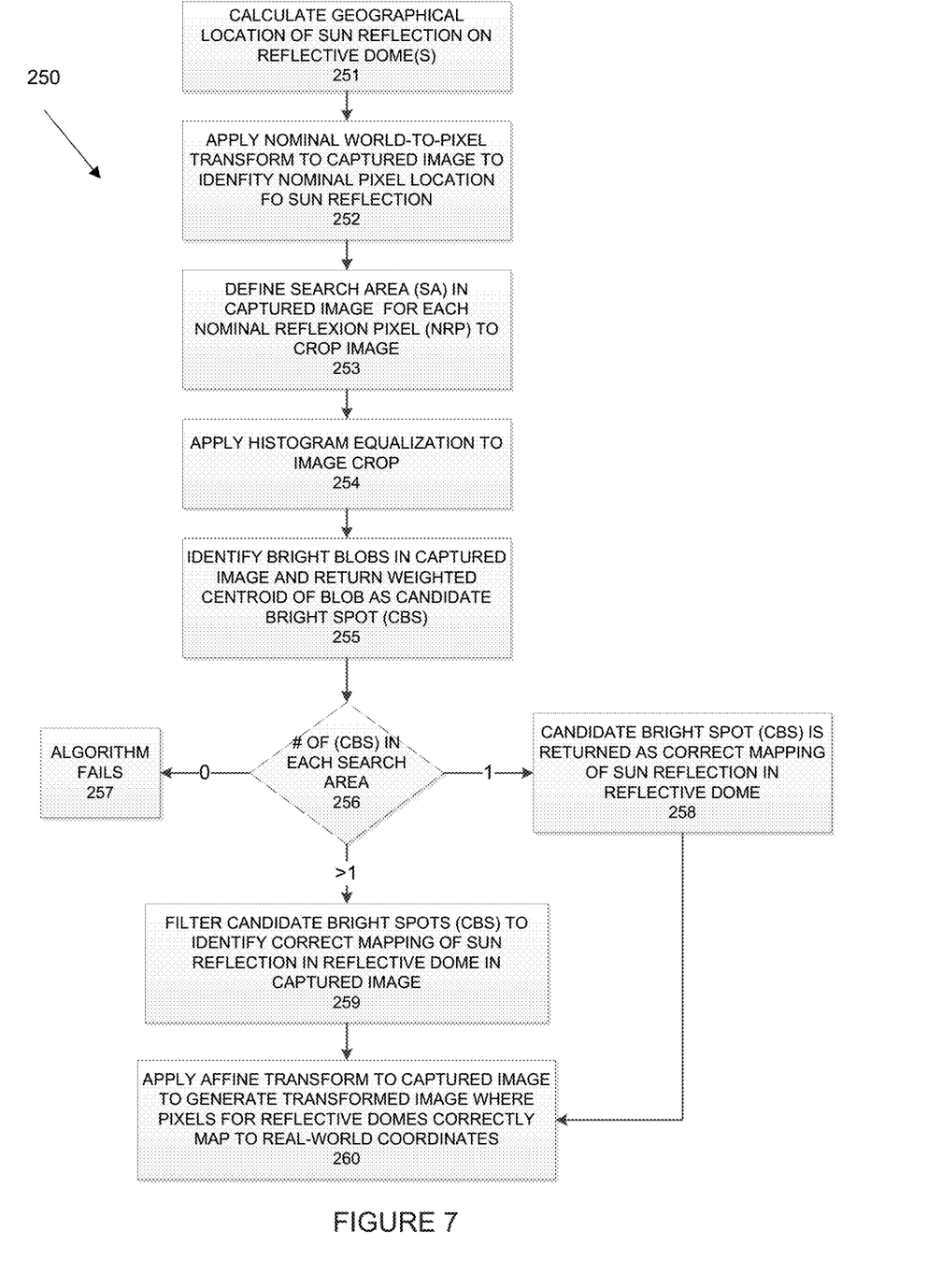
FIG. 7 is a flowchart of an algorithm for registering images.

FIGS. 4-6 show an image I (e.g., a time-stamped image) captured by the camera(s) 210-213 and illustrates the application of an algorithm (executed by a computer processor) for registering the image I, in order to thereafter estimate normal angles for the heliostats 122 to enable tracking control (e.g., closed-loop tracking control) of the heliostats 122 (e.g., using the tracking controller(s) 114). FIG. 7 is a flowchart of an algorithm 250 for registration of images captured by the camera(s) 210-213.

FIG. 4 shows the image I (e.g., time-stamped image) captured by the camera(s) 210-213. The image I can be converted to grayscale (e.g., by the computer processor) and pixel values are cast as floats to facilitate (e.g., enable) greater precision.

The algorithm 250 can include the following steps. First, a geographical (e.g., real-world) location of the reflection of the sun 150 on the surface 143 of the reflective dome 142 of the fiducial markers 140 is calculated 251 based on the sun's location at the time of image capture (e.g., the time-stamp on the image I), the location of the cameras 210-213, and the location (e.g., geographical location, real-world location) and the radius of the reflective dome 142.

Second, a nominal world-to-pixel transform is applied 252 (by the computer processor via a camera model) to find the nominal pixel location of the reflection of the sun in the fiducial markers 140 in the image I. For each nominal reflection pixel (see FIG. 4), a square within the edges of the image I is used to perform an image crop and define 253 a search area SA that is expected to contain the actual reflection pixel for the reflection of the sun in the fiducial markers 140. The size of the search area SA is based on the expected threshold on how far the camera can shift in any direction, determined empirically based on the stiffness of the camera mount and other external factors. The fiducial markers 140 (e.g., the reflective domes 142 of the fiducial markers 140) are preferably positioned far enough from the heliostats 122 so that the search area SA around the nominal reflection pixel does not include any pixels belonging to heliostats 122, as that can increase the rate of false positives during the image detection phase.

With continued reference to FIG. 4, the reflection of the sun 150 in the reflective domes 142 of the fiducial markers 140 will likely be the among the brightest spots in the image I. The algorithm includes applying 254 a histogram equalization to the image crop, which redistributes the pixel intensities in the image I and increases the contrast between the reflections of the sun 150 in the fiducial markers 140 (e.g., in the reflective domes 142) and the surrounding pixels. The algorithm includes calculating a mean and a standard deviation of the pixels in the equalized image, and masking out (e.g. filtering out) all the values less than three standard deviations away from the mean in the positive direction.

The algorithm uses connected components labeling to find or identify 255 bright blobs in the image I. The fiducial markers 140 (e.g., the reflective domes 142) are preferably positioned close enough to the cameras 210-213 (e.g., no more than about 80 meters away from the cameras) so that the optically blurred reflection of the sun 150 in the reflective domes 142 that are captured in the image I will be larger than one pixel at the desired exposure. Bright blobs in the image I that are only one pixel are assumed to be image noise and are filtered out. The weighted centroid of each blob is returned as a candidate bright spot CBS for the actual reflection of the sun in the reflective dome(s) 142.

The number of candidate bright spots CBS is evaluated 256. If only one candidate bright spot CBS is found (e.g., identified) for the reflection of the sun 150 in each fiducial marker 140 (e.g., in the reflective domes 142) in the image I, those pixel-candidate pairs are returned 258 by the algorithm as the mapping from nominal to shifted pixels. The algorithm excludes fiducial markers 140 for which no candidate bright spots CBS are found (e.g., identified) from the mapping. If more than one candidate bright spot CBS is found (e.g., identified) for the reflection of the sun 150 in a fiducial marker 140 (e.g., in the reflective dome 142) in the image I, the algorithm can apply or perform a filtering technique 259 to filter the candidate bright spots CBS and eliminate false detections. For example, assuming that movement of the camera(s) 210-213 results in a rigid transform of the image I, the distance-preserving property of a transform applied to the image I can be used to select the best candidate bright spot CBS for the reflection of the sun 150 in each fiducial marker 140 out of all candidates. The algorithm calculates all possible mappings by assigning one candidate bright spot CBS to the fiducial marker 140. For each possible mapping, the error of that mapping is calculated. The error is defined as the sum of a difference in nominal and actual distances between each pair of fiducial markers 140. The mapping of candidate bright spots CBS with the lowest error is chosen as the correct mapping of actual bright spots ABS (as seen in FIG. 5). To reduce the chances of a false detection of a fiducial marker 140, the algorithm can apply an error threshold such that if the best mapping has an error above the threshold, the algorithm fails and the image is not used. The algorithm can then be used on the next image captured by the camera(s) 210-213. If multiple failures occur (e.g., greater than a predetermined number of failures), an alert can be provided to a user for further evaluation.

If the mapping contains no fiducial markers 140, then no fiducial markers are found among the candidate bright spots CBS and the algorithm fails 257, and the image is not used, as discussed above. If only one fiducial marker 140 was found, then the rotation transform cannot be solved and the translation transform is calculated as the offset between the nominal pixel in the image I for the location of the of the fiducial marker 140 and the actual pixel in the image I for the location of the fiducial marker 140 in the mapping. If more than one fiducial marker 140 is found, techniques such as a linear optimization can be used by the algorithm to find the rotation and translation that minimizes the error between the nominal and transformed points for the mapping of the fiducial markers 140 in the image I. Such rotation and translation of the pixels in the image I are used to apply 260 an affine transform to the original image I (as seen in FIG. 6). The pixels in the transformed image TI for the fiducial markers 140 will correctly map to real-world coordinates (e.g., geographical coordinates) of the fiducial markers 140 using the nominal world-to-pixel transform calculated during the calibration process. Alternatively, a transform is applied to the geographical coordinates for the fiducial markers to map them to the captured image to register the image. The algorithm described above advantageously locates the fiducial markers 140, even at low exposure levels, where the ROI pixels in the image are not saturated (e.g. by the heliostats 122 reflecting parts of the sky that are close to the sun).

Figure 8:
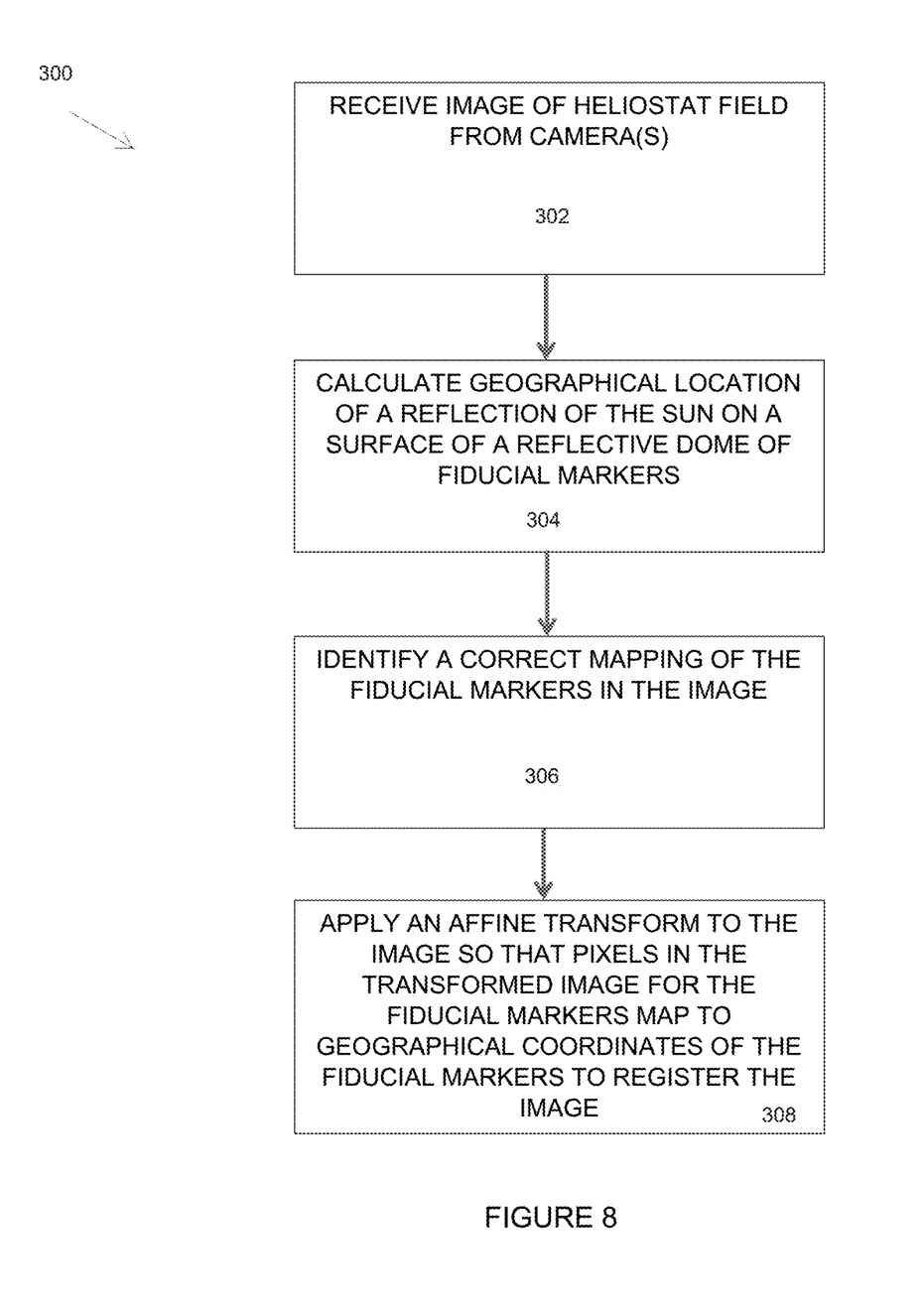
FIG. 8 is a flowchart of a process or method for the registration of heliostat images.

FIG. 8 shows a process or method 300 for the registration of heliostat images. The method 300 includes the step 302 of receiving an image of the heliostat field from one or more cameras (e.g., like cameras 210-213). The method 300 also includes the step of calculating a geographical location of a reflection of the sun on a surface of a reflective dome of fiducial markers positioned relative to the heliostat field so that they are in the field of view of the camera(s). In one example, the reflective dome has a hemispherical shape with a spherical outer surface (e.g., the outer surface is defined by a radius extending from a center of a base of the hemispherical shape). The geographical location can be calculated based on a location of the sun at a time corresponding to the time the image was captured, as well as based on a geographical location (e.g., surveyed location) and radius of the reflective dome of the fiducial markers and location of the lens of the viewing camera(s) 210-213 (e.g., of the viewing camera). The method 300 also includes the step of identifying a correct mapping of the fiducial markers (e.g., of the reflective domes, of the reflection of the sun in the reflective domes) in the captured image. The method 300 also includes the step 308 of applying an affine transform (e.g., rotation and translation) so that the pixels in the transformed image for the fiducial markers map to the geographical coordinates for the fiducial markers, in order to register the captured image. Alternatively, a transform is applied to the geographical coordinates for the fiducial markers to map them to the captured image to register the image.

Figure 9:
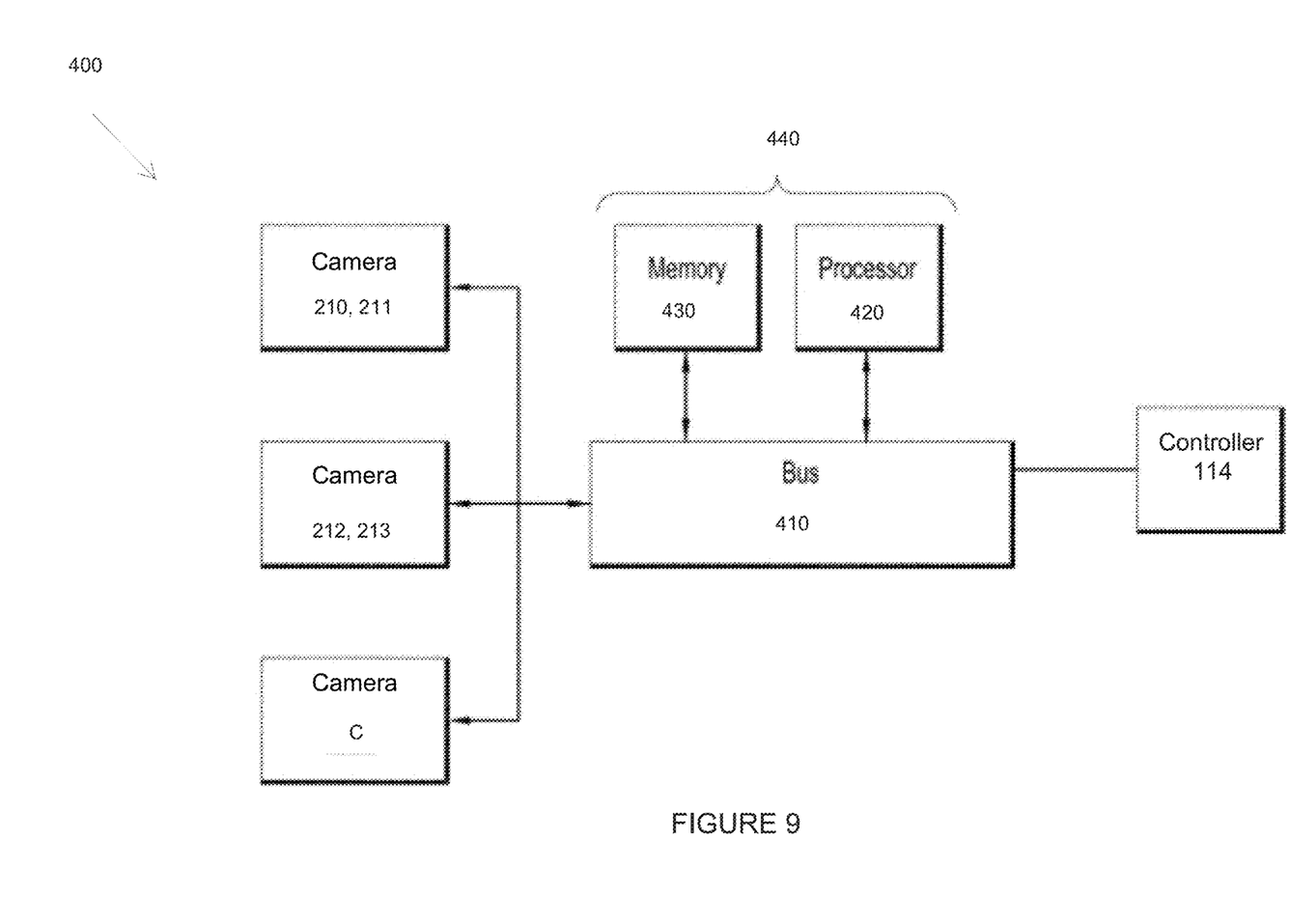
FIG. 9 is a schematic block diagram illustrating a processing system for registering heliostat images.

FIG. 9 is a block diagram illustrating a processing system 400 for performing the algorithm. The processing system 400 includes a bus 410 or other communication mechanism for communicating information. The system 400 also includes a processor 420 and memory 430 in communication with the bus 410 and providing a computing unit 440. The processor 420 processes information and executes instructions, such as the registration algorithm described above. The memory 430 stores information and instructions to be executed by the processor 420, such as the registration algorithm discussed above. The bus 410 receives captured images from the one or more cameras 210, 211, 212, 213, C for use by the processor 420 in processing information and executing instructions, such as the registration algorithm in the manner described above. Additionally, once the images are registered (e.g., and the normal angles for the heliostats 122 thereafter identified), the processing system 400 can provide instructions to the controller(s) 114 of the heliostats 122 in the heliostat field or array 120 to maintain or change an orientation (e.g., elevation angle and/or azimuth angle) of the mirror 110 of the heliostat 122 to focus sunlight reflected by the mirror(s) 110 to the aperture 132 of the receiver 130.

Additional Embodiments

In embodiments of the present disclosure, a system and method for registering images of heliostats in a heliostat field using reflective dome fiducial markers may be in accordance with any of the following clauses:

Clause 1: A system for registration of heliostat images for use in tracking control of heliostats in a heliostat field of a concentrated solar power (CSP) plant, comprising:
one or more cameras arranged relative to the heliostat field so that the heliostats are in a field of view of the one or more cameras, the one or more cameras operable to capture an image of the heliostat field;
a plurality of fiducial markers positioned relative to the heliostats of the heliostat field so that the fiducial markers are in the field of view of the one or more cameras, each of the fiducial markers having a reflective dome configured to reflect a sun; and
a processor configured to:
receive the captured image,
calculate a geographical location of a reflection of the sun on a surface of the reflective dome of the fiducial markers based on a location of the sun at a time corresponding to a time-stamp of the captured image, a geographical location and a radius of the reflective dome of the fiducial markers, and a geographical location of the one or more cameras that view the reflection, and
identify a correct mapping of the fiducial markers in the captured image.

Clause 2: The system of Clause 1, wherein the processor is further configured to apply an affine transform to the captured image via rotation and translation so that pixels in the transformed image for the fiducial markers map to geographical coordinates of the fiducial markers to thereby register the captured image.

Clause 3: The system of any preceding clause, wherein the reflective dome of each of the fiducial markers has a hemispherical surface.

Clause 4: They system of any preceding clause, wherein the one or more cameras are mounted on a tower, the heliostats arranged at least partially around the tower.

Clause 5: The system of any preceding clause, wherein after receiving the captured image and prior to calculating the geographical location of the reflection of the sun on the surface of the reflective dome of the fiducial markers, the processor converts the captured image to grayscale.

Clause 6: The system of any preceding clause, wherein the correct mapping of the fiducial markers is identified by the processor by:
performing a nominal world-to-pixel transform to find a nominal pixel location of the reflection of the sun in the captured image, a search area defined about the nominal pixel location of the reflection, identifying one or more candidate bright spots in the captured image for the fiducial markers, and filtering the candidate bright spots if more than one candidate bright spot is identified for at least one of the fiducial markers.

Clause 7: The system of Clause 6, wherein the search area corresponds to a threshold of a distance the one or more cameras can shift in any direction.

Clause 8: The system of Clause 6, wherein filtering the candidate bright spots comprises calculating all possible mappings by assigning one of the candidate bright spots to each fiducial marker, calculating an error value for each possible mapping based on a sum of a difference in nominal and actual distances between each pair of fiducial markers, and choosing the mapping with a lowest error as the correct mapping of the fiducial markers.

Clause 9: The system of any preceding clause, wherein the plurality of fiducial markers are two spaced-apart fiducial markers.

Clause 10: The system of Clause 8, wherein the plurality of fiducial markers are three spaced-apart fiducial markers, wherein the error value is an error in translation and rotation.

Clause 11: A method for registration of heliostat images for use in tracking control of heliostats in a heliostat field of a concentrated solar power (CSP) plant, comprising:
receiving with a computer processor an image of the heliostat field captured by one or more cameras;
calculating a geographical location of a reflection of a sun on a surface of a reflective dome of a plurality of fiducial markers positioned relative to the heliostat field so as to be in a field of view of the one or more cameras, the geographical location calculated based on a location of the sun at a time corresponding to a time-stamp of the captured image, a geographical location and a radius of the reflective dome of the fiducial markers, and a geographical location of the one or more cameras that view the reflection; and
identifying a correct mapping of the fiducial markers in the captured image.

Clause 12: The method of Clause 11, further comprising the step of applying an affine transform to the captured image via rotation and translation so that pixels in the transformed image for the fiducial markers map to geographical coordinates of the fiducial markers to thereby register the captured image.

Clause 13: The method of any of Clauses 11-12, wherein the reflective dome of each of the fiducial markers has a hemispherical surface.

Clause 14: The method of any of Clauses 11-13, further comprising converting the captured image to grayscale after receiving the captured image and before calculating the geographical location of the reflection of the sun on the surface of the reflective dome of the fiducial markers.

Clause 15: The method of any of Clauses 11-14, wherein the one or more cameras are mounted on a tower, the heliostats arranged at least partially around the tower.

Clause 16: The method of any of Clauses 11-15, wherein identifying the correct mapping of the fiducial markers comprises:
performing a nominal world-to-pixel transform to find a nominal pixel location of the reflection of the sun in the captured image, a search area defined about the nominal pixel location of the reflection,
identifying one or more candidate bright spots in the captured image for the fiducial markers, and
filtering the candidate bright spots if more than one candidate bright spot is identified for at least one of the fiducial markers.

Clause 17: The method of Clause 16, wherein the search area corresponds to a threshold of a distance the one or more cameras can shift in any direction.

Clause 18: The method of Clause 16, wherein filtering the candidate bright spots comprises calculating all possible mappings by assigning one of the candidate bright spots to each fiducial marker, calculating an error value for each possible mapping based on a sum of a difference in nominal and actual distances between each pair of fiducial markers, and choosing the mapping with a lowest error as the correct mapping of the fiducial markers.

Clause 19: The method of any of Clauses 11-18, wherein the plurality of fiducial markers are two spaced-apart fiducial markers.

Clause 20: The method of Clause 18, wherein the plurality of fiducial markers are three spaced-apart fiducial markers, wherein the error value is an error in translation and rotation.

Clause 21: A computer executable code stored in a computer readable memory, that when executed by a computer processor is configured to cause the computer processor to:
receive an image of a heliostat field captured by one or more cameras;
calculate a geographical location of a reflection of a sun on a surface of a hemispherical reflective dome surface of a plurality of spaced apart fiducial markers that are positioned relative to the heliostat field so as to be in a field of view of the one or more cameras, the geographical location calculated based on a location of the sun at a time corresponding to a time-stamp of the captured image, a geographical location and a radius of the reflective dome of the fiducial markers, and a geographical location of the one or more cameras that view the reflection; and
identify a correct mapping of the fiducial markers in the captured image.

Clause 22: The code defined in Clause 21, wherein when executed by the computer processor, the computer executable code causes the computer processor to apply an affine transform to the captured image via rotation and translation so that pixels in the transformed image for the fiducial markers map to geographical coordinates of the fiducial markers to thereby register the captured image.

Clause 23: The code as defined in any of Clauses 21-22, wherein after receiving the captured image and prior to calculating the geographical location of the reflection of the sun on the surface of the reflective dome of the fiducial markers, the processor converts the captured image to grayscale.

Clause 24: The code as defined in any of Clauses 21-23, wherein the correct mapping of the fiducial markers is identified by:
performing a nominal world-to-pixel transform to find a nominal pixel location of the reflection of the sun in the captured image, a search area defined about the nominal pixel location of the reflection,
applying a histogram equalization to the captured image to redistribute pixel intensities in the captured image and increase a contrast between pixels corresponding to the sun's reflection in the fiducial markers and surrounding pixels,
identifying one or more candidate bright spots in the captured image for the fiducial markers, and
filtering the candidate bright spots if more than one candidate bright spot is identified for at least one of the fiducial markers.

Clause 25: The code as defined in Clause 24, wherein filtering the candidate bright spots comprises calculating all possible mappings by assigning one of the candidate bright spots to each fiducial marker, calculating an error value for each possible mapping based on a sum of a difference in nominal and actual distances between each pair of fiducial markers, and choosing the mapping with a lowest error as the correct mapping of the fiducial markers.

Clause 26: The code as defined in any of Clauses 21-25, wherein the plurality of fiducial markers are two spaced apart fiducial markers.

Clause 27: The code as defined in Clause 25, wherein the plurality of fiducial markers are three spaced apart fiducial markers, wherein the error value is an error in translation and rotation.

One or more examples disclosed herein may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, mobile phones, servers, general purpose computers, special purpose computers, application-specific integrated circuit (ASIC), and digital/analog electronic circuits with discrete components, for example.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed systems and methods.

What is claimed is:

1. A system for registration of heliostat images for use in tracking control of heliostats in a heliostat field of a concentrated solar power (CSP) plant, comprising:
   one or more cameras arranged relative to the heliostat field so that the heliostats are in a field of view of the one or more cameras, the one or more cameras operable to capture an image of the heliostat field;
   a plurality of fiducial markers positioned relative to the heliostats of the heliostat field so that the fiducial markers are in the field of view of the one or more cameras, each of the fiducial markers having a reflective dome configured to reflect a sun; and
   a processor configured to:
      receive the captured image,
      calculate a geographical location of a reflection of the sun on a surface of the reflective dome of the fiducial markers based on a location of the sun at a time corresponding to a time-stamp of the captured image, a geographical location and a radius of the reflective dome of the fiducial markers, and a geographical location of the one or more cameras that view the reflection, and
      identify a correct mapping of the fiducial markers in the captured image.

2. The system of claim 1, wherein the processor is further configured to apply an affine transform to the captured image via rotation and translation so that pixels in the transformed image for the fiducial markers map to geographical coordinates of the fiducial markers to thereby register the captured image.

3. The system of claim 1, wherein the reflective dome of each of the fiducial markers has a hemispherical surface.

4. They system of claim 1, wherein the one or more cameras are mounted on a tower, the heliostats arranged at least partially around the tower.

5. The system of claim 1, wherein after receiving the captured image and prior to calculating the geographical location of the reflection of the sun on the surface of the reflective dome of the fiducial markers, the processor converts the captured image to grayscale.

6. The system of claim 1, wherein the correct mapping of the fiducial markers is identified by the processor by:
   performing a nominal world-to-pixel transform to find a nominal pixel location of the reflection of the sun in the captured image, a search area defined about the nominal pixel location of the reflection,
   identifying one or more candidate bright spots in the captured image for the fiducial markers, and
   filtering the candidate bright spots if more than one candidate bright spot is identified for at least one of the fiducial markers.

7. The system of claim 6, wherein the search area corresponds to a threshold of a distance the one or more cameras can shift in any direction.

8. The system of claim 6, wherein filtering the candidate bright spots comprises calculating all possible mappings by assigning one of the candidate bright spots to each fiducial marker, calculating an error value for each possible mapping based on a sum of a difference in nominal and actual distances between each pair of fiducial markers, and choosing the mapping with a lowest error as the correct mapping of the fiducial markers.

9. The system of claim 8, wherein the plurality of fiducial markers are three spaced-apart fiducial markers, wherein the error value is an error in translation and rotation.

10. The system of claim 1, wherein the plurality of fiducial markers are two spaced-apart fiducial markers.

11. A method for registration of heliostat images for use in tracking control of heliostats in a heliostat field of a concentrated solar power (CSP) plant, comprising:
   receiving with a computer processor an image of the heliostat field captured by one or more cameras;
   calculating a geographical location of a reflection of a sun on a surface of a reflective dome of a plurality of fiducial markers positioned relative to the heliostat field so as to be in a field of view of the one or more cameras, the geographical location calculated based on a location of the sun at a time corresponding to a time-stamp of the captured image, a geographical location and a radius of the reflective dome of the fiducial markers, and a geographical location of the one or more cameras that view the reflection; and
   identifying a correct mapping of the fiducial markers in the captured image.

12. The method of claim 11, further comprising the step of applying an affine transform to the captured image via rotation and translation so that pixels in the transformed image for the fiducial markers map to geographical coordinates of the fiducial markers to thereby register the captured image.

13. The method of claim 11, wherein the reflective dome of each of the fiducial markers has a hemispherical surface.

14. The method of claim 11, further comprising converting the captured image to grayscale after receiving the captured image and before calculating the geographical location of the reflection of the sun on the surface of the reflective dome of the fiducial markers.

15. The method of claim 11, wherein the one or more cameras are mounted on a tower, the heliostats arranged at least partially around the tower.

16. The method of claim 11, wherein identifying the correct mapping of the fiducial markers comprises:
performing a nominal world-to-pixel transform to find a nominal pixel location of the reflection of the sun in the captured image, a search area defined about the nominal pixel location of the reflection,
identifying one or more candidate bright spots in the captured image for the fiducial markers, and
filtering the candidate bright spots if more than one candidate bright spot is identified for at least one of the fiducial markers.

17. The method of claim 16, wherein the search area corresponds to a threshold of a distance the one or more cameras can shift in any direction.

18. The method of claim 16, wherein filtering the candidate bright spots comprises calculating all possible mappings by assigning one of the candidate bright spots to each fiducial marker, calculating an error value for each possible mapping based on a sum of a difference in nominal and actual distances between each pair of fiducial markers, and choosing the mapping with a lowest error as the correct mapping of the fiducial markers.

19. The method of claim 18, wherein the plurality of fiducial markers are three spaced-apart fiducial markers, wherein the error value is an error in translation and rotation.

20. The method of claim 11, wherein the plurality of fiducial markers are two spaced-apart fiducial markers.

21. A non-transitory computer-readable medium storing a computer executable code, that when executed by a computer processor is configured to cause the computer processor to: receive an image of a heliostat field captured by one or more cameras; calculate a geographical location of a reflection of a sun on a surface of a hemispherical reflective dome surface of a plurality of spaced apart fiducial markers that are positioned relative to the heliostat field so as to be in a field of view of the one or more cameras, the geographical location calculated based on a location of the sun at a time corresponding to a time-stamp of the captured image, a geographical location and a radius of the reflective dome of the fiducial markers, and a geographical location of the one or more cameras that view the reflection; and identify a correct mapping of the fiducial markers in the captured image.

22. The non-transitory computer-readable medium storing a computer executable code according to claim 21, wherein when executed by the computer processor, the computer executable code causes the computer processor to apply an affine transform to the captured image via rotation and translation so that pixels in the transformed image for the fiducial markers map to geographical coordinates of the fiducial markers to thereby register the captured image.

23. The non-transitory computer-readable medium storing a computer executable code according to claim 21, wherein after receiving the captured image and prior to calculating the geographical location of the reflection of the sun on the surface of the reflective dome of the fiducial markers, the processor converts the captured image to grayscale.

24. The non-transitory computer-readable medium storing a computer executable code according to claim 21, wherein the correct mapping of the fiducial markers is identified by: performing a nominal world-to-pixel transform to find a nominal pixel location of the reflection of the sun in the captured image, a search area defined about the nominal pixel location of the reflection, applying a histogram equalization to the captured image to redistribute pixel intensities in the captured image and increase a contrast between pixels corresponding to the sun's reflection in the fiducial markers and surrounding pixels, identifying one or more candidate bright spots in the captured image for the fiducial markers, and filtering the candidate bright spots if more than one candidate bright spot is identified for at least one of the fiducial markers.

25. The non-transitory computer-readable medium storing a computer executable code according to claim 24, wherein filtering the candidate bright spots comprises calculating all possible mappings by assigning one of the candidate bright spots to each fiducial marker, calculating an error value for each possible mapping based on a sum of a difference in nominal and actual distances between each pair of fiducial markers, and choosing the mapping with a lowest error as the correct mapping of the fiducial markers.

26. The non-transitory computer-readable medium storing a computer according to claim 25, wherein the plurality of fiducial markers are three spaced apart fiducial markers, wherein the error value is an error in translation and rotation.

27. The non-transitory computer-readable medium storing a computer according to claim 21, wherein the plurality of fiducial markers are two spaced apart fiducial markers.

* * * * *